United States Patent Office 3,336,998
Patented Aug. 22, 1967

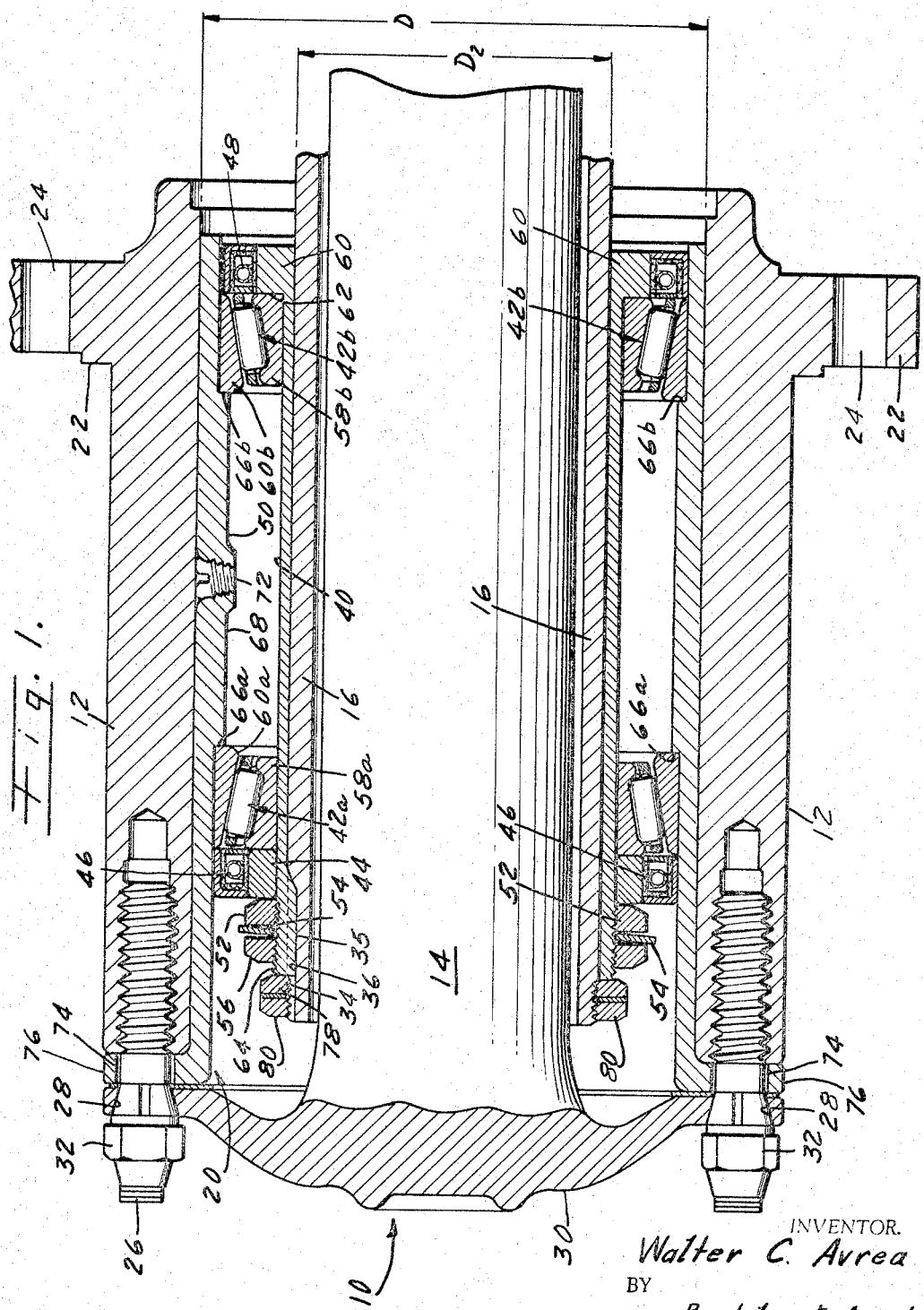

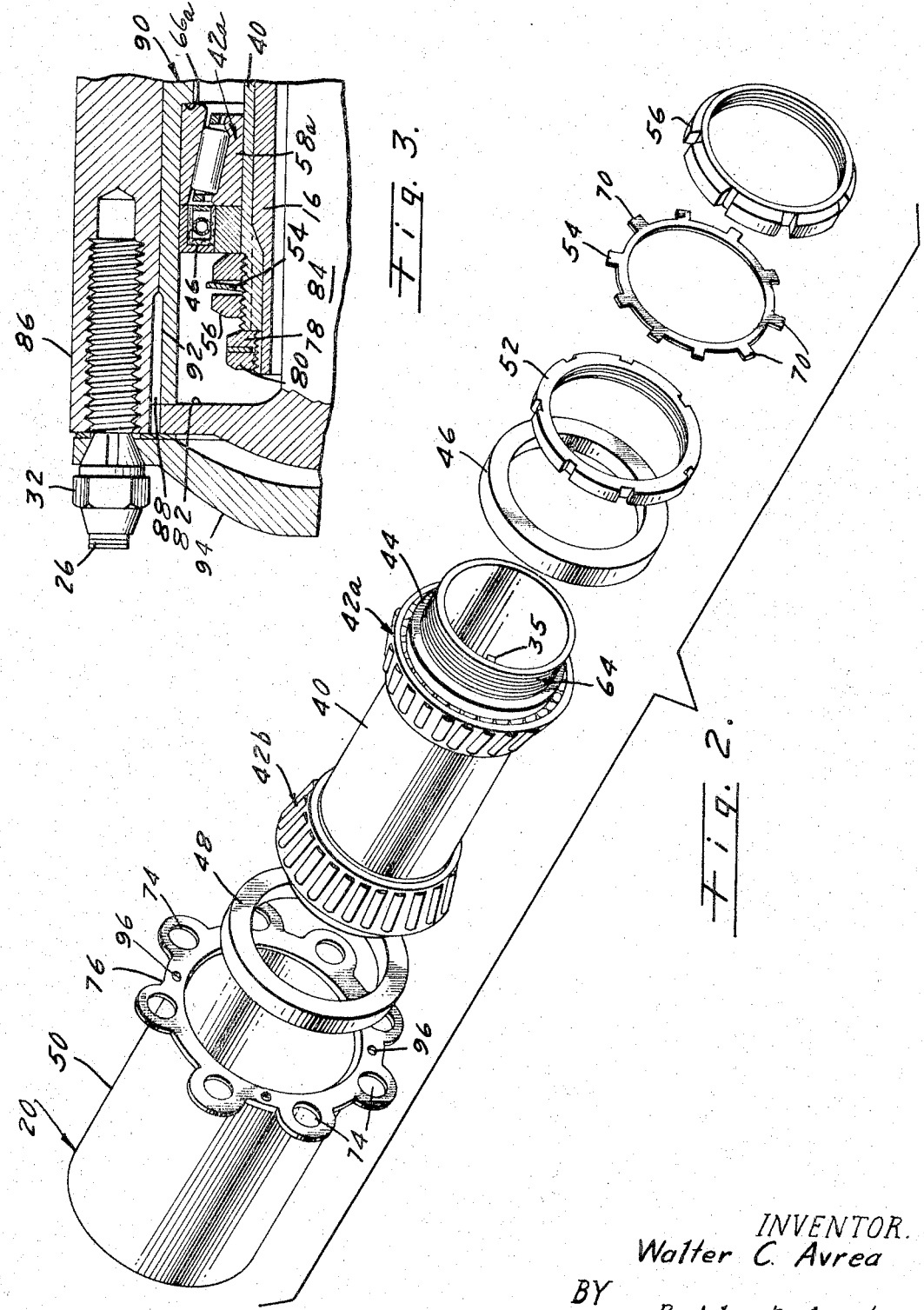

3,336,998
WHEEL MOUNTING LUBRICATION
CARTRIDGE
Walter C. Avrea, 9446 Rosehedge Drive,
Pico Rivera, Calif. 90660
Filed June 28, 1965, Ser. No. 467,365
10 Claims. (Cl. 180—88)

This invention relates to wheel assemblies and more particularly to a wheel lubrication cartridge utilizing sealed preloaded bearings and adaptable for installation as a replaceable unit in wheel hub assemblies for vehicles.

In all moving vehicles, the periodic servicing of wheel bearings is a requirement to assure continued reliable performance. Such servicing includes packing suitable lubricant around the bearings to prevent excessive wear. As a rule, the removal of the wheel is necessary and, unless properly re-assembled, the wheel bearing may be damaged, even destroyed. Other malfunctions may also follow. For example, loosely adjusted wheel bearings cause excessive drum "wobble" which in turn causes imperfect contact between lining and drum resulting in grabbing, erratic or noisy brakes, uneven lining wear and overall loss in braking efficiency.

The present invention alleviates these disadvantages by providing a wheel lubrication cartridge in which suitable wheel bearings are pre-loaded and properly lubricated. To service vehicles equipped with the invention requires only the removal of the wheel lubrication cartridge then in use and the installation of a like replacement unit. The time for servicing the vehicle is thereby substantially reduced and all guess work in adjusting the wheel bearings properly eliminated.

It is therefore an object of the invention to provide a wheel lubrication cartridge for vehicles.

It is another object of the invention to provide a lubrication cartridge of the type described for facilitating the servicing of wheel bearings in motor vehicles.

It is still another object of the invention to provide a lubrication cartridge of the type described wherein pre-loading of the bearings can be accurately and uniformly achieved.

It is yet another object of the invention to provide a wheel bearing lubrication cartridge of the type described which may repeatedly be disassembled, repacked with lubricant, and re-adjusted for proper bearing loading and subsequent re-use.

Another object of the invention is to provide a wheel assembly utilizing a wheel bearing lubrication cartridge of the type described for facilitating the servicing of motor vehicles.

These and other objects and features of the invention will be brought out more fully in the following description taken in conjunction with the drawing wherein:

FIGURE 1 is a longitudinal sectional view of a driving wheel hub section for a vehicle utilizing a wheel bearing lubrication cartridge according to the invention;

FIGURE 2 is an exploded perspective view showing the component parts of the lubrication cartridge of FIGURE 1; and FIGURE 3 is a fragmentary longitudinal section similar to FIGURE 1 showing a second embodiment of the invention.

Referring now to the drawings, shown in FIGURE 1 is a hub assembly 10 for a vehicle, now shown, comprising a hub 12, an axle 14, a support member 16 and a wheel bearing lubrication cartridge 20 in accordance with the invention.

The hub 12 as seen in FIGURE 1 may be cylindrical in form and may include a wheel mounting flange 22 to which one or more wheels, also not shown, may be attached by conventional fasteners extending through openings 24. At its outer end, the hub 12 includes a number of threaded studs 26 for purposes to be described. The reference letter D is used to identify the inside diameter of the opening extending through the hub 12 at its center.

The axle 14 shown in FIGURE 1 is of the free floating type and includes an outer bolt-type flange or spider 30 having a series of openings 28 suitably aligned to receive the studs 26. A conventional nut 32 secures the axle 14 via the spider 30 to the hub 12.

The support member 16 in the preferred embodiment comprises a cylindrical extension of a chassis mounted member of the vehicle such as the differential housing. The outside diameter of support member 16 is shown in FIGURE 1 by the reference letter $D_2$. A threaded portion 34 and a key-way 36 are provided on the outer end of the support member 16. The diameter of the axle 14 is less than the inside diameter of support member 16 to permit free rotation of the axle 14. In applications where the hub 12 is a non-driving part of the vehicle, a spindle, not shown, having an outside diameter $D_2$ may be substituted for the axle 14 and the support member 16.

As seen best in FIGURE 2, the wheel bearing lubrication cartridge 20 includes an inner cylindrical member 40, two bearing assemblies 42a and 42b, a collar 44, oil seals 46 and 48, an outer cylindrical housing 50, a bearing adjusting nut 52, a lock ring 54, and a lock nut 56.

The cylindrical member 40, reference FIGURE 1, includes at one end an outwardly extending radial flange portion 60 forming an annular bearing surface 62. A threaded portion 64 is provided at the other end of the cylindrical member 40 for receiving the bearing adjusting nut 52 and the lock nut 56.

The bearing assemblies 42a and 42b are preferably of the tapered roller bearing type and respectively include inner race elements 58a and 58b and outer race elements 60a and 60b. The inner race elements 58a and 58b are supportedly mounted on the inner cylindrical member 40 with the outer edge surface of the inner race element 58b engaging the bearing surface 62 of the flange 60. The inner edge surfaces of the outer race elements 60a and 60b are in surface contact with annular surfaces 66a and 66b formed by an inwardly extending central portion 68 of the housing 50. The collar 44, upon advancing the bearing adjusting nut 52 onto the inner cylindrical member 40, forces the inner race element 58a to the right, as seen in FIGURE 1, and this in turn imposes a like force via the outer race element 60a and annular surface 66a upon the housing 50. This force is further transmitted through annular surface 66b to the outer race element 60b of bearing assembly 42b, hence to the inner race element 58b to the flange portion 60 via the bearing surface 62. The result is the housing 50 may rotate relative to the member 40 on the bearing assemblies 42a and 42b which, by proper adjustment of the bearing adjusting nut 52, may be pre-loaded by a predetermined and proper amount.

The locking ring 54 includes tabs 70, several of which may be folded backwardly over the bearing adjusting nut 52 or forwardly over the locking nut 56 to maintain the pre-loaded condition imposed upon the bearing assemblies 42a and 42b of the lubrication cartridge 20. The cylindrical housing 50 also includes a removable plug 72 in the central portion 68 for filling the space intermediate the bearing assemblies 42a and 42b with a suitable bearing lubricant. The seals 46 and 48 confine this lubricant material to this space.

The outer cylindrical housing 50 is mechanically coupled to the hub 12 and the axle 14 through spider 30, reference FIGURE 1, by means of the nut 32 tightened on the threaded studs 26 which extend through openings 74, as best seen in FIGURE 2, formed in an outwardly extending flange 76. The lubrication cartridge 20 is also mechanically coupled by a pair of lock nuts 78 and 80 to the support member 16. By having a key element 35 engaging the keyway 36, the inner housing 40 and hence the cartridge 20 is anchored against rotation. With this arrangement, the inner cylindrical member 40 is stationary and supported by the support member 16; the outer cylindrical housing 50 on the other hand is free to rotate, along with the hub 12 and the axle 14, about the bearing asemblies 42a and 42b. The oil seals 46 and 48 likewise rotate along with housing 50 about the collar 46 and the flange portion 60 respectively.

A slightly different arrangement is shown in FIGURE 3 for mechanically coupling both the axle and the lubrication cartridge to the hub. Instead of having the spider-type arrangement of FIGURE 1, the outer edge of a flange 82 of an axle 84 is connected in force transmitting relationship to a hub 86 by means of a spline indicated by a reference numeral 88. A lubrication cartridge 90, in all respects similar to the cartridge 20 except a mating spline portion 92 is provided instead of the flange 76, is also mechanically coupled to the hub 86 through spline portion 92 and the spline 88. A hub cap 94 through studs 26 and nuts 32 serves to retain the axle 84 and the lubrication cartridge 90 in proper position in the hub 86. As in FIGURE 1, the inner member 40 is held stationary on the support member 16 by lock nuts 78 and 80 while the outer housing 50 is free to turn along with the hub 86 and the axle 84 about the bearing assemblies 42a and 42b.

Thus, there has been shown a lubrication cartridge for wheel hub assemblies for vehicles. When so equipped, routine servicing of wheel bearings may be quickly completed by simple replacement of the cartridge as a unit and the subsequent installation of a like unit properly loaded with bearing lubricant and properly adjusted to accurate and uniform pre-load conditions. In this servicing operation, the mechanic merely removes the old lubrication cartridge by removing lock nuts 78 and 80, and nuts 32 from studs 26. The axle 14 may then be removed and the lubrication cartridge 20, reference FIGURE 1, in turn removed. Between the openings 74 provided in the flange 76 may also be provided threaded openings 96 into which a threaded shaft or bolt, not shown, may be advanced which, upon bearing on the hub 12 at its edge intermediate the studs 26, will assist in the removal of the lubrication cartridge 20 from the hub 12. Plating the outer cylindrical housing 50 may also be used to prevent sticking or freezing and facilitate the removal of the lubrication cartridge 20. The installation of a replacement is completed in reverse order. Thus, there is no need for a mechanic to even put a wrench to the adjusting nut 52 and the lock nut 56. Faulty operation due to either too tight or too loose a wheel bearing is therefore eliminated. Later, after the wheel servicing operation is completed and the vehicle returned to income producing operations, the replaced lubrication cartridge may be re-conditioned and made ready for future operational use as the need arises.

While the invention has herein been shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A load bearing lubrication cartridge adapted to rotatably mount a load bearing wheel on a support member, said cartridge comprising an inner cylindrical member adapted to fit around said support member and in engagement therewith, first and second bearing assemblies mounted on said cylindrical member, a cylindrical housing member surrounding said inner cylindrical member and adapted to mount said load bearing wheel, one of said members including means for maintaining said bearing assemblies in spaded apart relationship, the other of said members having a flange portion at one end and a threaded portion at the opposite end, fastener means received by said threaded portion and coacting with said flange portion to impose oppositely directed forces on said bearing assemblies, lubricant seal means disposed between said housing member and said inner member and axially outwardly of said bearing assemblies to confine lubricant materials to the space therebetween, and attachment means for securing said cartridge jointly to said support member and said load bearing wheel.

2. A load bearing cartridge as in claim 1 wherein the flange and the threaded portion are on the inner cylindrical member and the means for maintaining said bearing assemblies in spaced apart relationship is on the cylindrical housing member, said attachment means being a nut in threaded engagement with said support member and in axial engagement with said inner cylindrical member.

3. A lubrication cartridge as in claim 1 wherein there is a support member in the form of a sleeve mounted upon a vehicle, an axle extending through the sleeve and a hub surrounding and supported by said housing member, said hub being a hub for said load bearing wheel.

4. A lubrication cartridge as in claim 3 wherein said attachment means for securing said cartridge jointly to said support member and said load bearing wheel comprises a threaded end on said sleeve with a nut on said threaded end and an outwardly extending flange on said cylindrical housing member in nonrotatable engagement with said hub.

5. A lubrication cartridge as in claim 3 wherein said inner cylindrical member is keyed to said sleeve with an axially removable key and said bearing assemblies are tapered roller bearings in oppositely tilted relationship.

6. In a wheel hub assembly for a vehicle including a hub having a circular opening extending therethrough, a floating axle shaft mechanically coupled to said hub, and a cylindrical support member extending from the differential housing of said vehicle, a replaceable wheel lubrication cartridge comprising an inner cylindrical member adapted for mounting on said support member and keyed thereto, said inner cylindrical member including a flange portion and a threaded portion at opposite ends thereof, a pair of tapered roller bearings disposed on said inner cylindrical member, a cylindrical housing surrounding said inner cylindrical member and said roller bearings and having an outside diameter substantially equal to said circular hub opening, said cylindrical housing including means for maintaining said tapered roller bearings in spaced apart relationship and means for locking said cylindrical housing to said hub; threaded locking means engageably received by said threaded portion and coacting with said flange portion to pre-load said tapered roller bearings, oil seal means for each of said roller bearings and disposed outwardly therefrom to confine lubricant materials to the space therebetween, and lock retainer means mechanically connected to said cylindrical support for retaining said wheel lubrication cartridge thereon, said means for locking said cylindrical housing to said hub comprising an outwardly extending flange portion mechanically coupled between said hub and the outer end of said axle shaft.

7. In a wheel hub assembly for a vehicle including a hub having a circular opening extending therethrough, a floating axle shaft mechanically coupled to said hub, and a cylindrical support member extending from the differential housing of said vehicle, a replaceable wheel lubrication cartridge comprising an inner cylindrical member adapted for mounting on said support member and keyed thereto, said inner cylindrical member including a flange portion and a threaded portion at opposite ends thereof, a pair of tapered roller bearings disposed on said inner cylindrical member, a cylindrical housing surrounding said inner cylindrical member and said roller bearings and having an outside diameter substantially equal to said circular hub opening, said cylindrical housing including means for maintaining said tapered roller bearings in spaced apart relationship and means for locking said cylindrical housing to said hub, threaded locking means engageably received by said threaded portion and co-acting with said flange portion to pre-load said tapered roller bearings, oil seal means for each of said roller bearings and disposed outwardly therefrom to confine lubricant materials to the space therebetween, and lock retainer means mechanically connected to said cylindrical support for retaining said wheel lubrication cartridge thereon, said locking means of said cylindrical housing comprising a spline engagedly coupled to the spline connecting said axle shaft to said hub.

8. In a wheel hub assembly for a vehicle including a hub having a circular opening extending therethrough, a floating axle shaft mechanically coupled to said hub, and a cylindrical support member extending from the differential housing of said vehicle, a replaceable wheel lubrication cartridge comprising an inner cylindrical member adapted for mounting on said support member and keyed thereto, said inner cylindrical member including a flange portion and a threaded portion at opposite ends thereof, a pair of tapered roller bearings disposed on said inner cylindrical member, a cylindrical housing surrounding said inner cylindrical member and said roller bearings and having an outside diameter substantially equal to said circular hub opening, said cylindrical housing including means for maintaining said tapered roller bearings in spaced apart relationship and means for locking said cylindrical housing to said hub, threaded locking means engageably received by said threaded portion and co-acting with said flange portion to pre-load said tapered roller bearings, oil seal means for each of said roller bearings and disposed outwardly therefrom to confine lubricant materials to the space therebetween, and lock retainer means mechanically connected to said cylindrical support for retaining said wheel lubrication cartridge thereon, said outwardly extending flange portion including a plurality of openings for receiving a threaded shaft for applying a force to said hub for removing said wheel lubrication cartridge therefrom.

9. In a wheel hub assembly for a vehicle including a hub having a circular opening extending therethrough and a spindle mounted to the chassis of said vehicle, a replaceable wheel lubrication cartridge comprising an inner cylindrical member adapted for mounting on said spindle in fixed relationship therewith and including a flange portion and a threaded portion at opposite ends thereof, a pair of tapered roller bearings disposed on said inner cylindrical member, a cylindrical housing surrounding said inner cylindrical member and said roller bearings and having an outside diameter substantially equal to said circular hub opening, said cylindrical housing including means for maintaining said tapered roller bearings in spaced apart relationship and means for locking said cylindrical housing to said hub, threaded locking means engageably received by said threaded portion and co-acting with said flange portion to pre-load said tapered roller bearings, oil seal means for each of said roller bearings and disposed outwardly therefrom to confine lubricant materials to the space therebetween, and lock retainer means mechanically connected to said spindle for retaining said wheel lubrication cartridge thereon, said means for locking said cylindrical housing to said hub comprising an outwardly extending flange on the cylindrical housing having openings for receiving threaded fasteners extending from said hub.

10. In a wheel hub assembly for a vehicle including a hub having a circular opening extending therethrough and a spindle mounted to the chassis of said vehicle, a replaceable wheel lubrication cartridge comprising an inner cylindrical member adapted for mounting on said spindle in fixed relationship therewith and including a flange portion and a threaded portion at opposite ends thereof, a pair of tapered roller bearings disposed on said inner cylindrical member; a cylindrical housing surrounding said inner cylindrical member and said roller bearings and having an outside diameter substantially equal to said circular hub opening, said cylindrical housing including means for maintaining said tapered roller bearings in spaced apart relationship and means for locking said cylindrical housing to said hub, threaded locking means engageably received by said threaded portion and co-acting with said flange portion to pre-load said tapered roller bearings, oil seal means for each of said roller bearings and disposed outwardly therefrom to confine lubricant materials to the space therebetween, and lock retainer means mechanically connected to said spindle for retaining said wheel lubrication cartridge thereon, said outwardly extending flange of said cylindrical housing including a plurality of openings adapted to receive a threaded shaft for applying a force on said hub to remove said wheel lubrication cartridge therefrom.

References Cited
UNITED STATES PATENTS

| 2,076,218 | 5/1937  | Alden         | 308—211   |
| 2,723,169 | 11/1955 | Petit         | 208—195   |
| 2,747,948 | 5/1956  | Jergens       | 308—207 X |
| 2,836,473 | 5/1958  | Tydeman       | 308—207   |
| 3,156,506 | 11/1964 | Scheifele et al. | 308—211 |

KENNETH H. BETTS, *Primary Examiner.*